United States Patent [19]

Cuscurida et al.

[11] 4,309,532

[45] Jan. 5, 1982

[54] MODIFICATION OF AMINO POLYOLS WITH EPOXY RESINS

[75] Inventors: Michael Cuscurida; Neal J. Grice; George P. Speranza, all of Austin, Tex.

[73] Assignee: Texaco Inc., White Plains, N.Y.

[21] Appl. No.: 183,558

[22] Filed: Sep. 2, 1980

[51] Int. Cl.$^3$ .................. C07C 91/10; C07C 93/00; C07H 15/18; C08G 18/28
[52] U.S. Cl. .................................. 536/4; 260/9; 260/18 EP; 525/507; 528/103; 528/361; 528/407; 536/120; 544/162; 544/398; 544/401; 564/325; 564/346; 564/475; 564/505
[58] Field of Search .............. 260/9, 18 EP; 564/346, 564/475, 505, 325; 528/103, 361, 407; 525/507; 536/4, 120; 544/162, 398, 401

[56] References Cited

U.S. PATENT DOCUMENTS

| | | | |
|---|---|---|---|
| 3,265,641 | 8/1966 | Wismer et al. | 536/120 X |
| 3,544,655 | 12/1970 | Booth et al. | 528/103 X |
| 3,691,110 | 9/1972 | Ohfuka et al. | 528/407 |
| 4,076,930 | 2/1978 | Ellingboe et al. | 536/120 X |
| 4,116,900 | 9/1978 | Belanger | 528/103 X |

*Primary Examiner*—Earl A. Nielsen
*Attorney, Agent, or Firm*—Carl G. Ries; Robert A. Kulason; David L. Mossman

[57] ABSTRACT

The modification of rigid amino polyols by their reaction with epoxy resin and alkylene oxides is described. The modified polyols produce rigid polyurethane foams that have higher heat distortion temperatures and better low temperature properties than foams made with non-modified polyols. The viscosities of the epoxy resin-modified amino polyols are not significantly different than those of the prior art amino polyols although they are of a higher functionality.

16 Claims, No Drawings

MODIFICATION OF AMINO POLYOLS WITH EPOXY RESINS

This application is related to applications Ser. Nos. 183,543, 183,610, and 183,611, all being filed on Sept. 2, 1980.

BACKGROUND OF THE INVENTION

1. Field of the Invention

The invention relates to the modification of polyols by the addition of epoxy resin and, more particularly, relates to the addition of epoxy resins to amines and polyol initiators to produce modified polyols suitable for use in improved rigid polyurethane foams.

2. Description of the Prior Art

Presently, amino polyols suitable for use in rigid foams are made by the reaction of sucrose and an amine with mixtures of alkylene oxides. Persons skilled in the art of making polyols can add alkylene oxides to polyhydric initiators such as sucrose, methylglucoside, sorbitol, etc. and mixtures of these products with aliphatic or aromatic amines to prepare products in the 350–650 hydroxyl number range. While generally satisfactory, foam prepared from these prior art polyols have poor dimensional stability at low temperature and a low heat distortion temperature. Conventional means of improving these properties by use of a higher functionality initiator or short chain crosslinkers lead to high viscosity materials which are hard to process and show poor compatability with isocyanates. Therefore, it is an object of this invention to increase the functionality of polyols such as sucrose amino polyols by their reaction with epoxy resins to prepare a new type of polyether polyol which would produce improved rigid foams.

Other patents disclose reactions involving polyols and epoxy resins. Japanese Pat. No. 71-24,255 concerns the reaction of a glycerine-based 3,000 molecular weight triol with 2% Bisphenol A epoxy resin to produce foams with increased hardness. A close examination of this patent will show that the epoxy resin is added at the end of the triol chain. Those skilled in the art of making polyols would expect that this technique could not be used in making polyols for rigid foams. Such polyols are very high in functionality and one would expect a high degree of crosslinking which would result in gelled products. Our invention involves the addition of sucrose-type polyols to polyepoxides so that the epoxy resin derivative is in the interior of the polyol or at the end of the polyol chain. The preparation of our products is more easily accomplished and is more reproducible than those of the prior art. Also, the functionalities of the initiators of this invention are higher than the triol used in the Japanese patent.

U.S. Pat. No. 3,012,984 describes how hydroxyl terminated polyesters, epoxy resins and isocyanate-terminated prepolymers may be reacted in an inert organic solvent to produce metal primers and coatings. U.S. Pat. No. 3,010,940 discloses how phenol, epoxy resins, polyisocyanates and alpha-methylbenzyldimethylamine react to produce various polyurethane coatings. U.S. Pat. No. 3,448,046 describes how polyols containing chlorine are mixed with epoxy resins before reaction with an isocyanate. The free epoxides scavenge the HCl in the polyol and do not contribute to the functionality of the polyol. The reaction of an epoxide with an alcoholic hydroxyl group is set out in U.S. Pat. No. 3,317,609. The production of amino alcohols by reacting aminoethoxyethanol with an epoxide is set out in U.S. Pat. No. 3,335,186. Further, British Pat. No. 968,102 describes how polyols suitable for polyurethane foams may be prepared from the reaction of a polyol, and an epoxy resin in the presence of an acidic catalyst.

Other prior art polyols include those described in German Offenlegungschrifft No. 2,056,080. This patent describes how epoxy adhesives may be made by the reaction of epoxy resins with 4-mercaptobutanol-blocked urethane prepolymers which are made from toluene diisocyanate and various polyols. German Offenlegungschrifft No. 1,905,696 discloses how polyurethane lattices may be produced by chain-extending a urethane prepolymer by using the reaction product of polyethylene glycols of a molecular weight of about 5,000 to 10,000, and an aromatic diglycidyl ether. The modification of epoxy resins by heating them with added polyalkoxylated disaccharides is described in Belgium Pat. No. 785,020.

SUMMARY OF THE INVENTION

The invention concerns modified amino polyols useful in preparing rigid polyurethane foams that are the reaction product of a rigid foam polyol initiator selected from the group of initiators having an active hydrogen functionality equal to or greater than four; one or more alkylene oxides; an amine and an epoxy resin. The invention also concerns methods of making the modified polyols, improved rigid foams from the polyols and methods of making such foams.

DESCRIPTION OF THE PREFERRED EMBODIMENTS

The modified polyols of this invention may be made by reacting a rigid foam polyol initiator and an amine with one or more alkylene oxides to extend the polyol chain, and adding epoxy resin in such a manner that the epoxy resin is added at selected points along the length of the polyol chain or at an end of the resulting product. This tends to increase the overall functionality of the polyol chain. It is recommended that at least two equivalents of hydroxyl functionality be present in the alkylene oxide adduct per equivalent of epoxy resin added to the reaction mixture to avoid gelling of the epoxy by cross linking with itself. The epoxy resin may be added before, during and/or after the addition of alkylene oxide to the polyol initiator. One skilled in the art who is practicing this invention may determine the best procedure with respect to when additions should be made and at what temperature and during which times the reaction mixture is to be heated within the scope of this invention.

It is well known to prepare polyethers for polyurethane applications by, for example, the base catalyzed reaction of propylene oxide with an initiator having a hydroxy functionality equal to or greater than four, that is, containing more than three reactive hydrogen atoms. Such initiators include, for example, sorbitol, methyl glucoside, and sucrose. When base catalysis is used, the alkaline catalysts normally employed are sodium hydroxide and potassium hydroxide. Other techniques to prepare polyols are known to those skilled in the art.

Generally, the polyol initiators useful herein should have an active hydrogen functionality equal to or greater than four. The preferred initiators for this invention are the class suitable for use in rigid polyurethane foams particularly glycoside derivatives. Polyether polyols suitable for use in polyurethane foams can be prepared by reacting a glycol ether with a starch to form a glycoside which may then be alkoxylated to form the polyol according to the methods of U.S. Pat. No. 3,721,665. It is especially preferred that the initiators be selected from the group consisting of sucrose, sorbitol, methyl glucoside, starch glycosides, aliphatic amines such as ethanolamine, diethanolamine, triethanolamine or ethylenediamine and aromatic amines such as aniline and toluene diamine.

According to the practice of this invention, an amine is mixed with the polyol initiator prior to the addition of the alkylene oxides. Generally, the preferred amines may be described by the formula

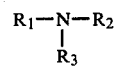

where $R_1$, $R_2$, and $R_3$ are (a) hydrogen or (b) are selected from alkyl, aryl, aralkyl, alkaryl radicals, or hydroxy alkyl each radical containing from 1 to 10 carbon atoms or (c) where $R_1$ and $R_2$ are joined together to form a morpholine or piperazine ring; or (d) are the radical $-(CH_2)_m-(H-N-(CH_2)_m)_n-Z$, wherein m is 2 or 3, n is 1 to 3 and Z is $-NH_2$ or $-OH$; and wherein the alkyl or aryl groups, or combinations thereof, comprising $R_1$ or $R_2$ individually can be substituted alkyl or substituted aryl groups containing hydroxyl, ether, amino, or carboxyl substituents, or admixtures thereof. Especially preferred amines include, for example, ammonia, methylamine; dimethylamine; diethylamine; dipropylamine; dibutylamine; ethylenediamine; 1,3-propanediamine; diethylenetriamine; triethylenetetramine; hexaethyleneheptamine; imino-bis-propylamine; ethanolamine; diethanolamine; triethanolamine; isopropanolamine; diisopropanolamine; triisopropanolamine; aminoethylethanolamine; aniline; benzylamine; piperazine; morpholine; and the like.

The alkylene oxides useful in this invention are ethylene oxide, propylene oxide and 1,2-butylene oxide. Ethylene oxide and propylene oxide are preferred for this invention, and these reactants are used in the examples herein. More than one alkylene oxide may be added to the reaction mixture as deemed necessary by one skilled in the art practicing this invention.

It is anticipated that a wide variety of epoxy resins would be useful in practicing this invention. The vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred. The diglycidyl ether of bisphenol A is used in the examples herein. This epoxy resin may be represented by the following structure:

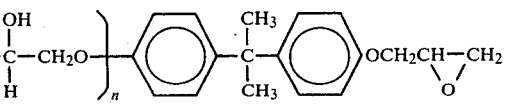

where n is zero or one. Some of these epoxy resins are known in the trade as "Epon" resins and may be obtained from Shell Chemical Co.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol,

| | |
|---|---|
| 2,4'-dihydroxydiphenylethylmethane, | 3,3'- |
| dihydroxydiphenyldiethylmethane, | 3,4'- |
| dihydroxydiphenylmethylpropylmethane, | 2,3'- |
| dihydroxydiphenylethylphenylmethane, | 4,4'- |
| dihydroxydiphenylpropylphenylmethane, | 4,4'- |
| dihydroxydiphenylbutylphenylmethane, | 2,2'- |
| dihydroxydiphenylditolylmethane, | 4,4'- | dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2',3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The reaction conditions of temperature and pressure may be selected by the invention practitioner to meet certain specifications required by the polyol for a particular use. The examples herein use a pressure of about 30 to 50 psig and a temperature of about 70° to 150° C. as representative conditions for the making of modified polyols that would be useful in rigid foams. The amount of epoxy resin to be added to the reaction mixture should be such that the epoxy equivalents present are less than half of the hydroxyl functionality equivalents present in the reaction mixture. Too many epoxy equivalents in relation to the hydroxyl equivalents may cause the epoxy resin to gel by cross-linking with itself. As a result a large excess of hydroxyl equivalents may be used in the reaction mixture and still be within the spirit and scope of this invention.

Examples I through V show the preparation of the modified polyols described herein as well as the preparation of a prior art polyol. The major difference between the examples is the amine that is used. Example VI shows how modified polyols and prior art polyols may be used to prepare rigid foams, and comparative data between the two are presented. U.S. Pat. No. 4,094,828 describes how rigid polyurethane foams may be made and this description is incorporated here by reference.

EXAMPLE I

This example will illustrate the preparation of the epoxy resin-modified polyols of this invention.

Into a ten-gallon kettle were charged 10 lb. 67% aqueous sucrose and 6 lb. diethanolamine. The reactor was then evacuated and purged with prepurified nitrogen. A mixture of 7.36 lb. propylene oxide and 0.64 lb. ethylene oxide was then reacted at 80° C. at 34 psig. Approximately one-hour was required for addition of the mixed oxides. The reaction mixture was then digested one-hour and vented. Water (2.4 lb.) was then removed by vacuum stripping at 80° C. A mixture of 14.64 lb. propylene oxide and 1.36 lb. ethylene oxide was then reacted at 80° C. over a one-half hour period. The reaction mixture was then digested 1.5 hours to an equilibrium pressure. The diglycidyl ether of Bisphenol A (0.8 lb.) was then added and reacted three hours at 80° C. The product was then vacuum stripped to a minimum pressure at 110° C., nitrogen-stripped and drained from the kettle. The finished product had the following properties.

| Properties | |
|---|---|
| Amine content, meq/g | 1.49 |
| Hydroxyl no., mg KOH/g | 533 |
| Viscosity, 77° F., cps | 6500 |
| Water, wt. % | 0.02 |
| Color, Gardner | 10 |
| pH in 10:6 isopropanol-water | 11.1 |

EXAMPLES II–V

Using the procedure of Example I, epoxy resin-modified polyols were prepared by reaction of mixtures of propylene oxide and ethylene oxide with mixtures of 67% aqueous sucrose and various amines. Reaction charges and polyol properties are shown in the following table. For comparison, reaction charges and properties of a prior art polyol is included as Example IV.

|  | II | III | IV | V |
|---|---|---|---|---|
| Charge | | | | |
| Sucrose, 67% aqueous, lb. | 10.0 | 10.0 | 10.5 | 10.0 |
| Monoethanolamine, lb. | 3.5 | — | — | — |
| Amine C-12,[1] lb. | — | 4.0 | 4.0 | — |
| Triethanolamine, lb. | — | — | — | 8.5 |
| Propylene oxide, lb. | 25 | 24.5 | 24.1 | 21 |
|  | mixed | | | |
| Ethylene oxide, lb. | 2.5 | 2.0 | 2.2 | 2.0 |
| Diglycidyl ether of Bisphenol A[2], lb. | 0.8 | 0.8 | — | 0.8 |
| Properties | | | | |
| Amine content, meq/g | 1.54 | 1.50 | 1.53 | 1.48 |
| Hydroxyl no., mg KOH/g | 534 | 476 | 493 | 519 |
| Water, wt. % | 0.02 | 0.02 | 0.02 | 0.03 |
| Viscosity, 77° F., cps | 7100 | 7800 | 6600 | 5500 |
| Color, Gardner | 2 | 10–11 | 10 | 12 |
| pH in 10:6 isopropanol-water | 11 | 10.8 | 10.8 | 10.7 |

[1]distilled morpholine bottoms; 8.5 meq/g primary amine, 12.5 meq/g total amine; Texaco Chemical Co.
[2]EPON®828; Shell Chemical Co.

EXAMPLE VI

This example will illustrate the use of the polyols of this invention in rigid foam formulations. Formulations, details of preparation and foam properties are shown in the following table. Foams E and F use the prior art polyols.

|  | A | B | C | D | E | F |
|---|---|---|---|---|---|---|
| Formulation, pbw | | | | | | |
| Polyol from Example II | 33.5 | — | — | — | — | — |
| Polyol from Example I | — | 33.5 | — | — | — | — |
| Polyol from Example V | — | — | 34.1 | — | — | — |
| Polyol from Example III | — | — | — | 35.4 | — | — |
| Polyol from Example IV | — | — | — | — | 32.5 | — |
| THANOL®R-480[1] | — | — | — | — | — | 33.9 |
| THERMOLIN®RF-230[2] | 3.5 | 3.5 | 3.6 | 3.8 | 3.7 | 3.6 |
| FYROL®6[3] | 0.4 | 0.4 | 0.4 | 0.4 | 0.4 | 0.4 |
| THANCAT®TD-20[4] | 0.6 | 0.6 | 0.5 | 0.8 | 0.9 | 1.0 |
| DC-193 silicone[5] | 0.4 | 0.4 | 0.4 | 0.4 | 0.4 | 0.4 |
| Fluorocarbon R-11B | 13.5 | 13.5 | 14.0 | 14.3 | 14.1 | 13.8 |
| MONDUR®MR[6] | 48.5 | 48.5 | 47.5 | 45.5 | 45.8 | 47 |
| Details of preparation | | | | | | |
| Density, pcf | 2.02 | 2.12 | 2.03 | 2.09 | 2.01 | 1.97 |
| K-factor (BTU-in/(ft²)(hr.)°F. | 0.114 | 0.114 | 0.114 | 0.117 | 0.118 | 0.116 |
| Heat distortion temp., °C. | 183 | 178 | 183 | 183 | 154 | 166 |
| Compressive strength, psi | | | | | | |
| with rise | 42 | 36 | 42 | 42 | 40 | 43 |
| cross rinse | 19 | 18 | 17 | 17 | 14 | 12 |
| Volume change %, one week | | | | | | |
| 158° F., 100% relative humidity | 4.7 | 4.6 | 7.3 | 7.3 | 8.3 | 7.9 |
| 200° F., dry | 3.7 | 2.9 | 6.6 | 6.6 | 6.0 | 6.9 |
| <20° F., dry | −6.8 | −3.0 | −2.7 | −2.7 | −5.8 | −14.2 |

[1]Sucrose amino polyol; amine, meq/g 0.9; hydroxyl no., mg KOH/g 530; Texaco Chemical Co.
[2]Reactive fire retardant polyol; hydroxyl no., mg KOH/g 339; Olin Chemical Corp.
[3]Diethyl N,N-bis(2-hydroxyethyl)aminomethylphosphonate; hydroxyl no. mg KOH/g 450; Stauffer Chemical Co.
[4]80% dimethylethanolamine 20% triethylenediamine, Texaco Chemical Co.
[5]Dow-Corning Corp.
[6]2.7 functionality polymeric isocyanate; Mobay Chemical Corp.

It can be seen that rigid foams made with the modified polyols have improved physical properties over the foams made with the prior art polyols particularly with respect to heat distortion and low temperature stability.

These improved properties would make the foams particularly suited for refrigerator applications. It can also be noted that the improved foam properties may be obtained without a significant increase in the viscosity of the polyol.

We claim:

1. A modified amino polyol for use in preparing rigid polyurethane foams, the modified amino polyol being produced by the reaction of
   (a) a rigid foam polyol initiator having an active hydrogen functionality equal to or greater than four
   (b) an amine,
   (c) one or more alkylene oxides and
   (d) an epoxy resin.

2. The modified amino polyol of claim 1 in which the alkylene oxides are taken from the group of ethylene oxide, propylene oxide and 1,2-butylene oxide.

3. The modified amino polyol of claim 1 in which the epoxy resin is selected from the group of epoxy resins consisting of the diglycidyl ether of Bisphenol A, epoxy novolak resins and aliphatic epoxy resins.

4. The modified amino polyol of claim 1 in which the components are reacted in the range of 70° to 150° C. during the preparation of the modified amino polyol.

5. The modified amino polyol of claim 1 in which the epoxy resin is reacted last and the ratio of the equivalent weight of intermediate polyol oxide adduct to the equivalent weight of epoxy is at least 2 to 1.

6. The modified amino polyol of claim 1 in which the rigid foam polyol initiator is selected from the group of initiators consisting of sucrose, sorbitol, methyl glucoside, starch glycosides and aliphatic or aromatic amines.

7. The modified amino polyol of claim 1 in which the amine is taken from the group of ammonia, methylamine, dimethylamine, diethylamine, dipropylamine, dibutylamine, ethylenediamine, 1,3-propanediamine, diethylenetriamine, triethylenetetramine, hexaethyleneheptamine, imino-bis-propylamine, ethanolamine, diethanolamine, triethanolamine, isopropanolamine, diisopropanolamine, triisopropanolamine, aminoethylethanolamine, aniline, benzylamine, piperazine, morpholine, toluene diamine and aniline.

8. A modified amino polyol for use in preparing rigid polyurethane foams, the modified amino polyol being produced by the reaction of
   (a) a rigid foam polyol initiator having an active hydrogen functionality equal to or greater than four selected from the group of initiators consisting of sucrose, sorbitol, methyl glucoside, starch glycosides and aliphatic or aromatic amines
   (b) an amine,
   (c) one or more alkylene oxides and
   (d) an epoxy resin selected from the group of epoxy resins consisting of the diglycidyl ether of Bisphenol A, epoxy novolak resins and aliphatic epoxy resins
in which the epoxy resin is reacted last and in which the ratio of the equivalent weight of intermediate polyol oxide adduct to the equivalent weight of epoxy is at least 2 to 1.

9. A method for the preparation of a modified amino polyol for use in preparing rigid polyurethane foams which comprises
   (a) mixing an amine with a rigid foam polyol initiator having an active hydrogen functionality equal to or greater than four,
   (b) reacting the resulting mixture with one or more alkylene oxides, and
   (c) reacting the alkoxy adduct with an epoxy resin.

10. The method of claim 9 in which the alkylene oxides are taken from the group of ethylene oxide, propylene oxide and 1,2-butylene oxide.

11. The method of claim 9 in which the epoxy resin is selected from the group of epoxy resins consisting of the diglycidyl ether of Bisphenol A, epoxy novolak resins and aliphatic epoxy resins.

12. The method of claim 9 in which the components are reacted in the range of 80° to 110° C. during the preparation of the modified amino polyol.

13. The method of claim 9 in which the epoxy resin is reacted last and ratio of the equivalent weight of intermediate polyol oxide adduct to the equivalent weight of epoxy is at least 2 to 1.

14. The method of claim 9 in which the rigid foam polyol initiator is selected from the group of initiators consisting of sucrose, sorbitol, methyl glucoside, starch glycosides and aliphatic or aromatic amines.

15. The method of claim 9 in which the amine is taken from the group of ammonia, methylamine, dimethylamine, diethylamine, dipropylamine, dibutylamine, ethylenediamine, isopropanolamine, diisopropanolamine, triisopropanolamine, 1,3-propanediamine, diethylenetriamine, triethylenetetramine, hexaethyleneheptamine, imino-bis-propylamine, ethanolamine, diethanolamine, triethanolamine, aminoethylethanolamine, aniline, benzylamine, piperazine, morpholine, toluene diamine and aniline.

16. A method for the preparation of a modified amino polyol for use in preparing rigid polyurethane foams which comprises
   (a) mixing an amine with a rigid foam polyol initiator having an active hydrogen functionality equal to or greater than four selected from the group of initiators consisting of sucrose, sorbitol, methyl glucoside, starch glycosides and aliphatic or aromatic amines,
   (b) reacting the resulting mixture with one or more alkylene oxides, and
   (c) reacting the alkoxy adduct with an epoxy resin selected from the group of epoxy resins consisting of the diglycidyl ether of Bisphenol A, epoxy novolak resins and aliphatic epoxy resins, such that the ratio of equivalent weight of intermediate polyol oxide adduct to the equivalent weight of epoxy is at least 2 to 1.

* * * * *